April 1, 1941.    J. MUSIL ET AL    2,236,829
MACHINING OF NONPRISMATIC WORKPIECES
Filed Dec. 18, 1936    8 Sheets-Sheet 1

Josef Musil
Heinrich Ast
Inventors
by
Attorney

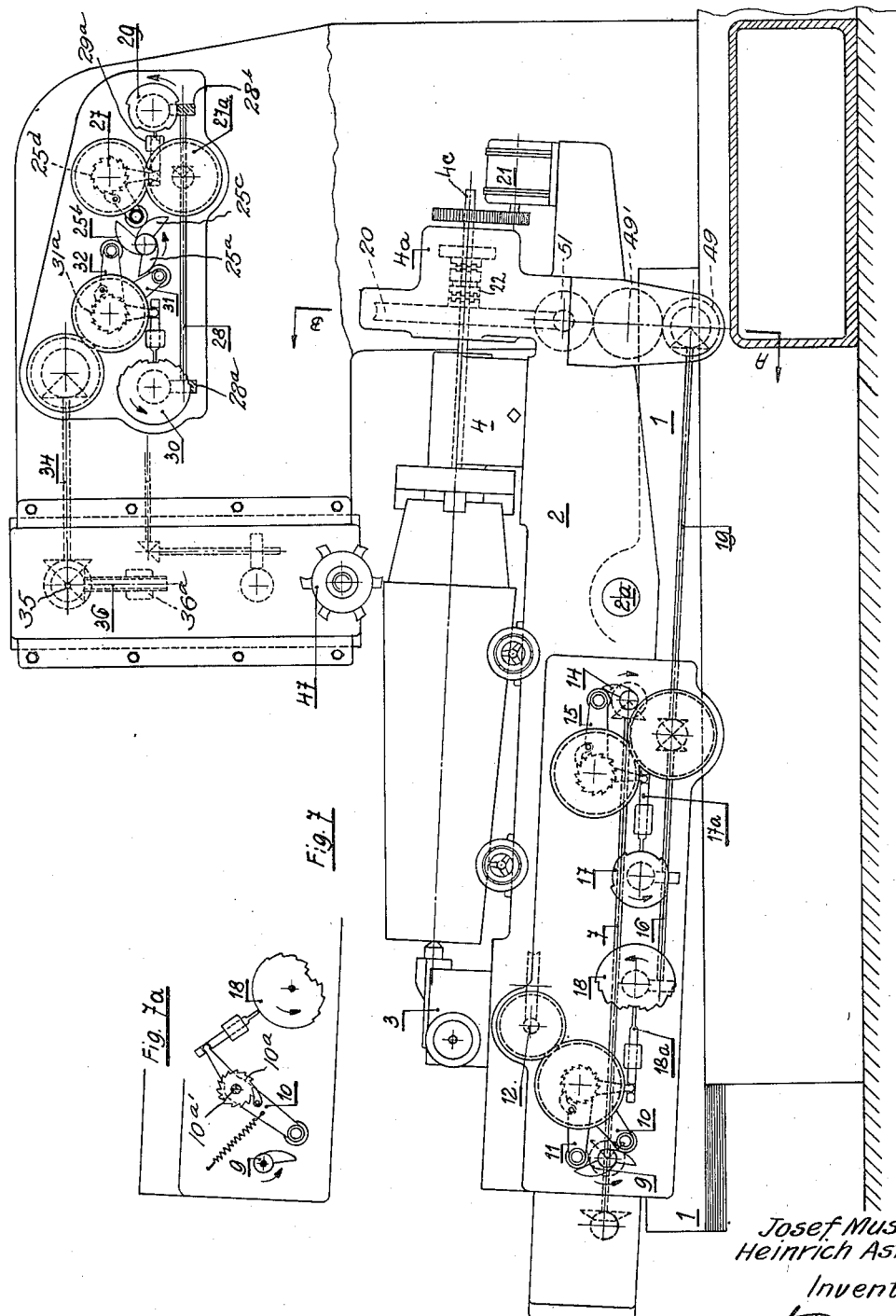

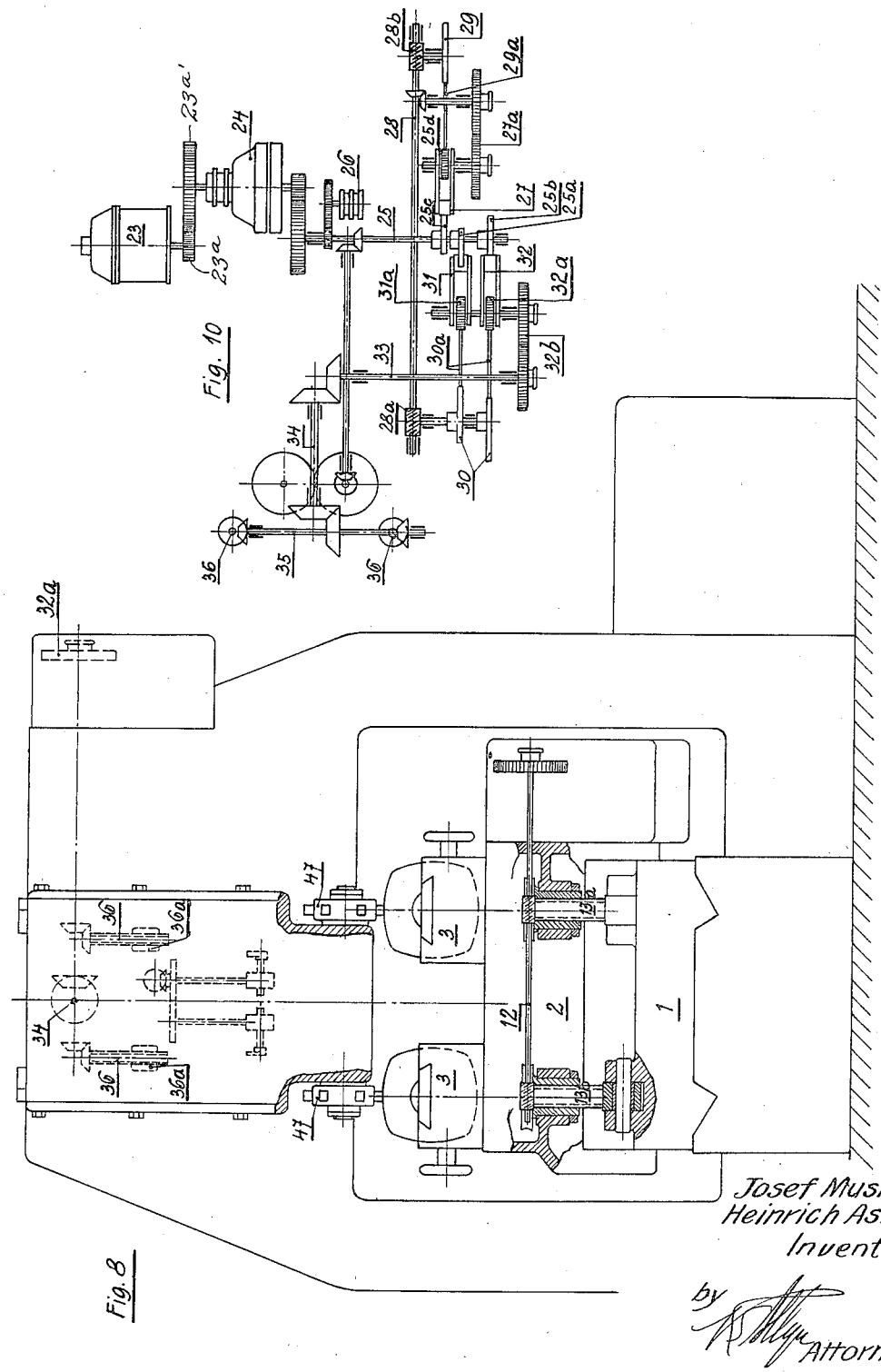

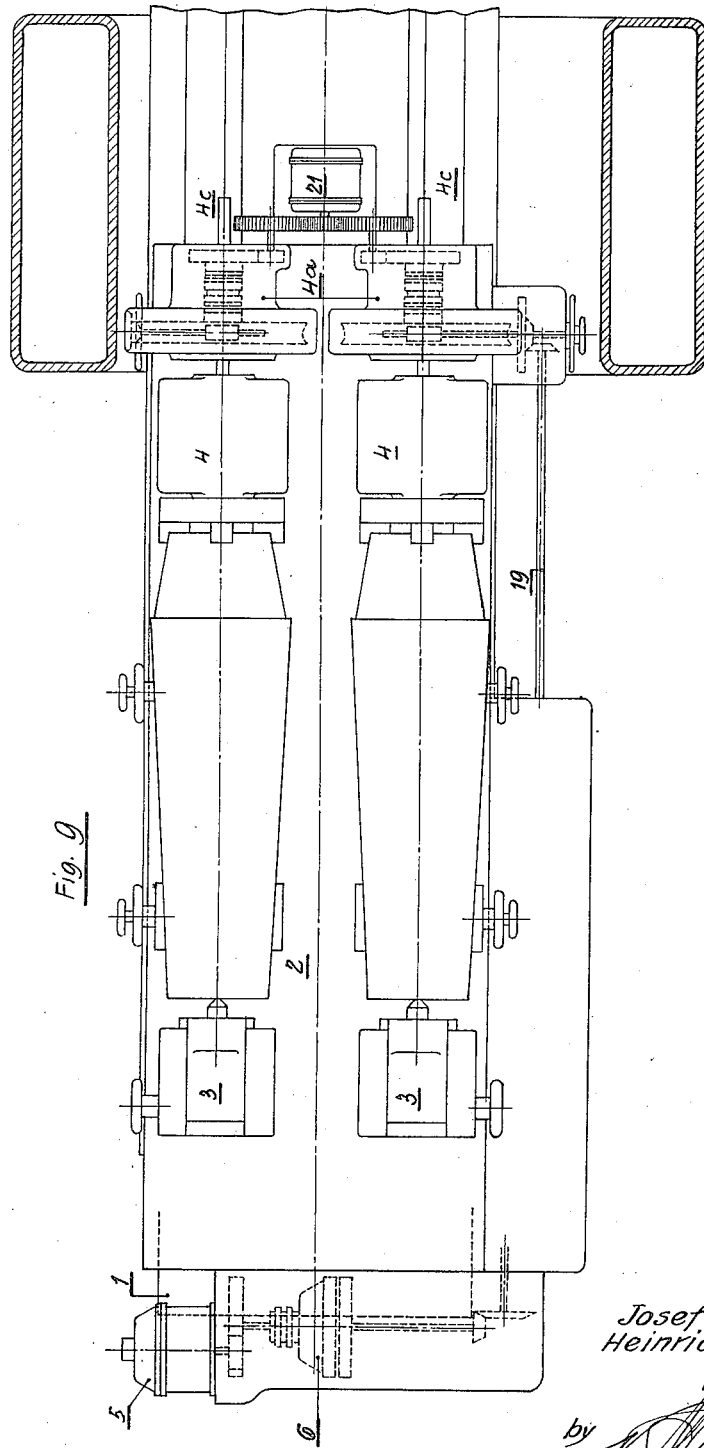

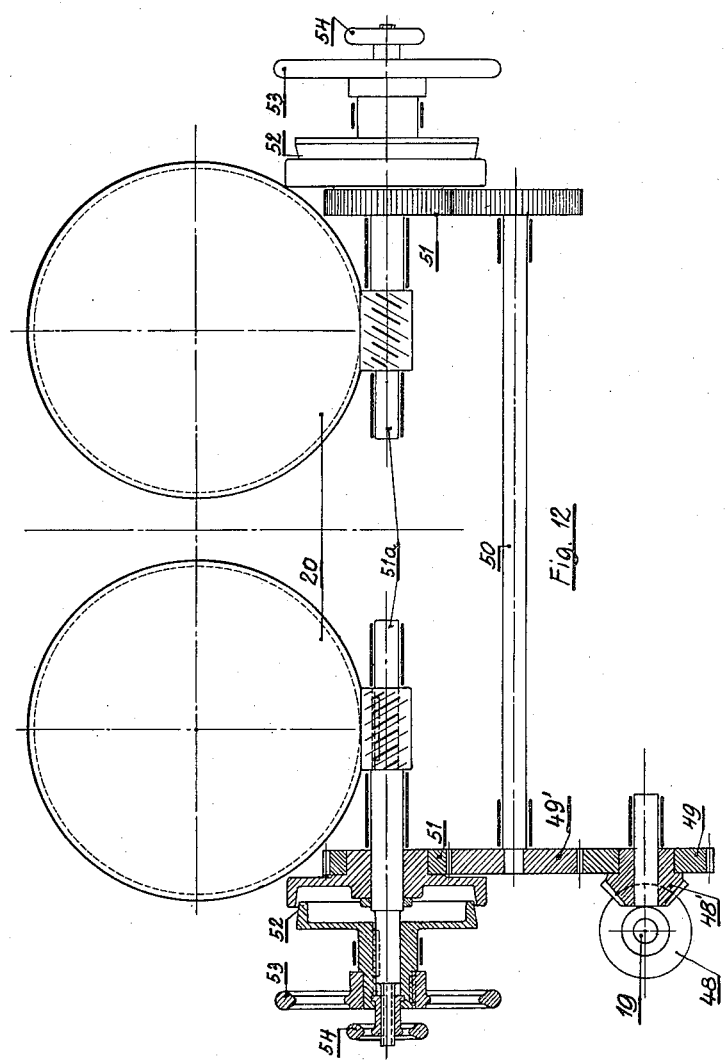

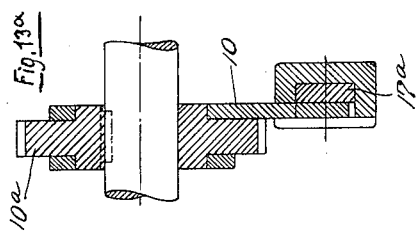
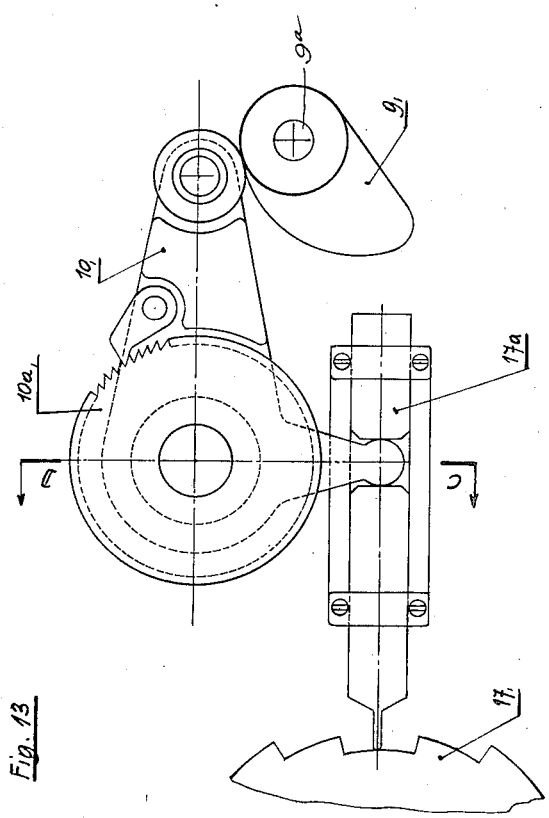

April 1, 1941.  J. MUSIL ET AL  2,236,829
MACHINING OF NONPRISMATIC WORKPIECES
Filed Dec. 18, 1936  8 Sheets-Sheet 8
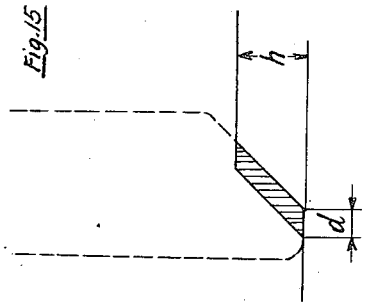
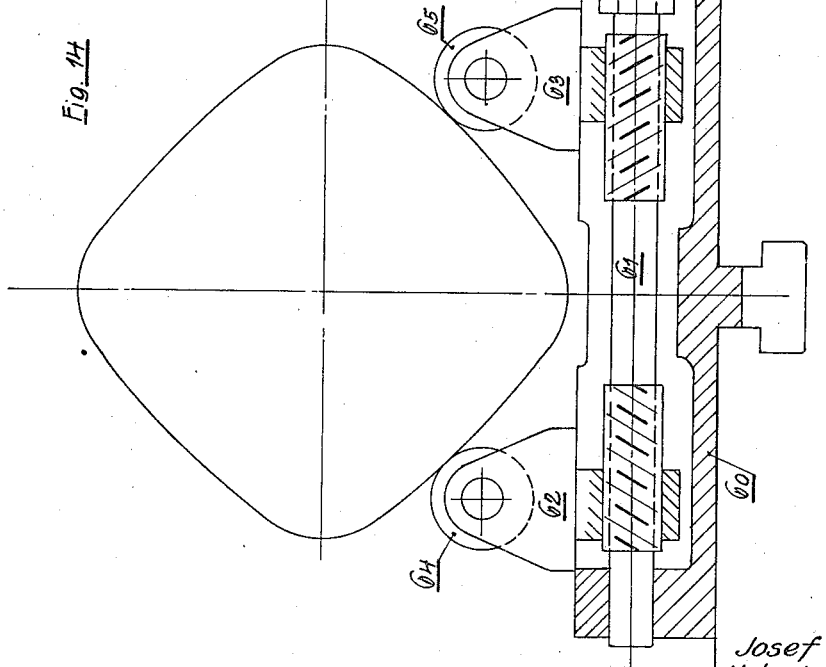
Josef Musil
Heinrich Ast
Inventors Patented Apr. 1, 1941

2,236,829

UNITED STATES PATENT OFFICE 2,236,829

MACHINING OF NONPRISMATIC WORKPIECES

Josef Musil and Heinrich Ast, Vienna, Austria

Application December 18, 1936, Serial No. 116,474
In Austria December 21, 1935

6 Claims. (Cl. 90—24)

This invention relates to a method of operating on the slant surface of nonprismatic workpieces, more particularly pyramidal or truncated pyramidal or conical or truncated conical blocks, for instance ingots or the like on machines in which the tool or the workpiece has a reciprocating motion, more particularly on planing machines, and to the arrangement of the machines for operating on such workpieces. The cross-section of the workpieces may be round or oval or cornered, for instance four-cornered or polygonal, and the form of the generatrix of the slant surface may deviate from a straight line and the workpieces may have convex or concave side surfaces or surfaces lying between the two.

It has already been proposed to operate on polygonal and tapering workpieces on planing machines and for this purpose to set up the workpieces in such a manner that during the operation the generatrices are horizontal. In this known method, however, it was necessary in order to operate on the whole of the slant surface to set up the workpiece several times.

With the method according to the invention the workpiece is set up on the machine in such a manner that its axis no longer lies horizontal, but at an inclination, the entire slant surface being however operated on in one setting-up. This is effected according to the invention by setting up workpieces of the form of a right circular cone on the machine in such a position that the generatrix of the workpiece lies horizontal, that is the axis of the workpiece lies at an inclination, and by rotating the workpiece about the inclined axis by means of a circumferential feed mechanism, so that it can be operated on over its entire slant surface in one setting-up.

For workpieces of another form than that of a right circular cone, but with a straight generatrix, more particularly pyramidal or truncated pyramidal or similarly shaped workpieces, the method is so carried out that the tool is given a feed motion in the vertical direction, which allows for the variable distance of the individual parts of the surface of the workpiece from the workpiece axis, whilst for workpieces with generatrices but at different angles to the workpiece axis, for instance pyramidal workpieces, the workpiece itself is given a suitable vertical adjustment at the change of stroke, by which the direction of the workpiece axis is so changed that the particular part of the workpiece surface to be operated on lies horizontal.

When, however, the generatrix of the workpiece differs from a straight line, then the tool and in some cases the workpiece also must be given during the operation as well, a vertical adjustment corresponding to the form of the generatrix, the direction of the workpiece axis being changed in such a manner during operative motion by the adjustment of the workpiece that the particular part of the workpiece surface to be operated on lies horizontal.

The construction of the machine in accordance with the invention corresponds substantially to the above method.

The accompanying drawings show as a constructional example a planing machine suitable for carrying out the method for workpieces of all kinds with a carriage provided with clamping heads for setting up the work and capable of travelling to and fro horizontally, on which for instance two blocks (ingots) can be set up next to one another in such a manner that the blocks are rotatable about an axis, one of the clamping heads being provided with a chuck and a circumferential feed mechanism and the tool being controlled in the vertical direction in accordance with the shape to be produced. The arrangement is made such that after each stroke of the carriage the workpiece performs as a feed motion a rotary motion corresponding to the width of the cutting, the angle of turn or the amount of the turning motion being capable of being varied in accordance with the requirements in each case, such that the width of cutting can be adjusted as desired and can be regulated according to requirements during one revolution.

Fig. 7 shows the machine in longitudinal section, Fig. 8 in end elevation and Fig. 9 in plan view, whilst in Fig. 7a control members are shown in detail.

Fig. 10 shows diagrammatically a constructional example of a mechanism for the vertical adjustment of the two tool carriers, from which is also derived the control of the tool holders for the forward and backward planing.

Fig. 12 shows in end elevation details of the circumferential feed mechanism for the workpiece and the means for actuating the circumferential feed of the workpiece by hand.

Figs. 13 and 13a show control mechanism details, namely the connection between the cams, the ratchet arrangements with the slide part and the control disc, Fig. 13a being taken on the line of C—D of Fig. 13.

Fig. 14 shows the bearing pedestals in detail.

Fig. 15 shows by way of illustration a cutting in cross-section.

Figure 1:
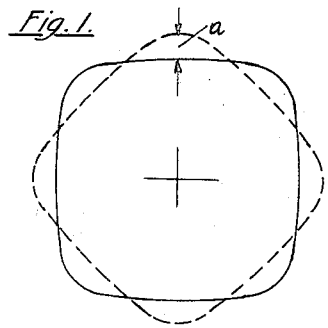
Fig. 1 represents a workpiece of four-cornered cross-section with rounded corners and convex side surfaces, the position in broken lines showing what must be the nature of the control motion of the tool for enabling the not circular workpiece to be operated on, in spite of the variable distance between the generatrix of the slant surface and the axis.
Figure 2:
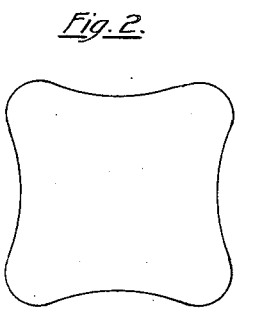
Fig. 2 shows a workpiece with concave side surfaces.
Figure 3:
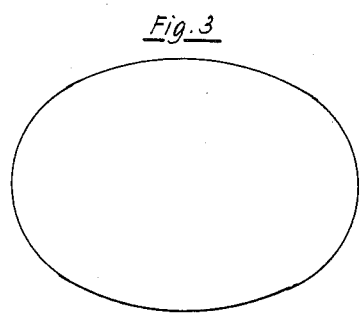
Fig. 3 shows a non-circular workpiece of oval cross-section.
Figure 4:
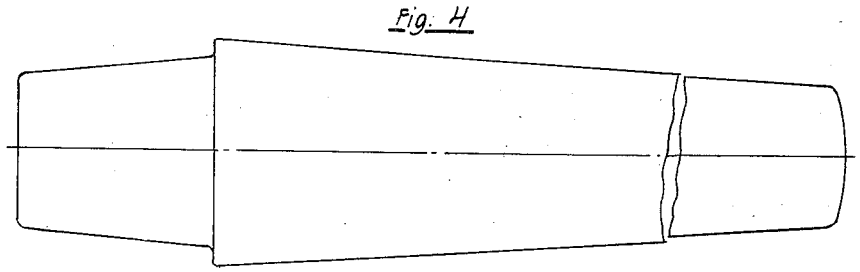
Fig. 4 shows a workpiece of tapering form.

The planing machine table 1 supports a plate 2 which is capable of being adjusted to an inclined position with the axis of rotation 2a. The plate 2 can be fixed in different inclined positions, but can also be adjusted by additional controlling means during operation to different inclinations. On the plate 2 are provided setting-up devices 3 and 4, of which at least one, preferably the setting-up device 3 which is more remote from the tool slide standard is displaceable in the longitudinal direction so that workpieces of different length can be set up. One of the two setting-up devices, preferably the stationary one, is provided with a circumferential feed mechanism. In the constructional example shown in the drawings the setting-up mechanism 4 is provided with a driving mechanism 4a, from which it is driven.

Figure 11:
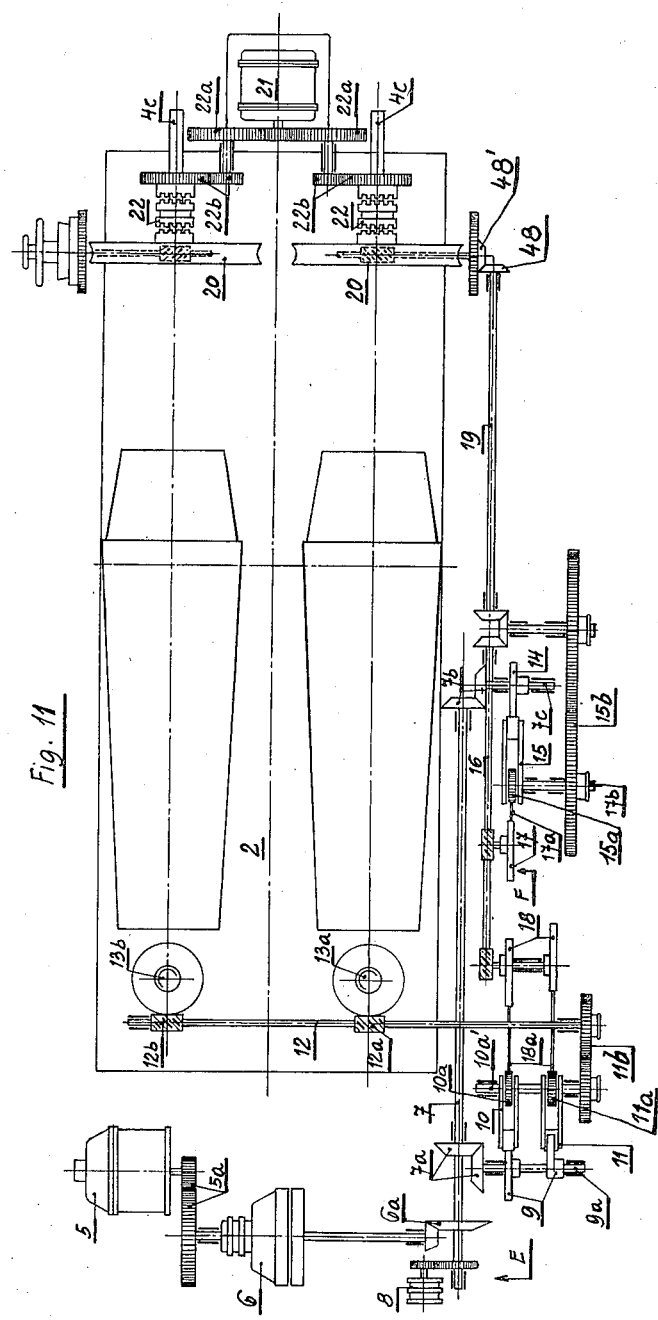
Fig. 11 shows diagrammatically a constructional example of a circumferential feed mechanism for the workpiece and the additional mechanism for the vertical adjustment of the bed.

For circumferentially feeding the workpieces (Figs. 9 and 11) the electromagnetic coupling 6 is driven by the motor 5 through the spur wheels 5a, and by way of this coupling through bevel wheels 6a the shaft 7, from which through bevel wheels 7b a shaft 7c is driven, on which is a cam 14 which intermittently lifts a ratchet 15 and thereby turns a ratchet wheel 15a. The coupling 6 is engaged and disengaged by means of a control drum 8 driven by the shaft 7. The ratchet 15 falls back only as far as allowed by a control disc 17 in combination with a sliding member 17a (Fig. 13). By the control disc shaft 17b and a pair of change wheels 15b the shaft 19 is driven and by the shaft 19 by means of the bevel wheels 48, 48' (Fig. 12) and the spur wheels 49, 49' the shaft 50 and by the latter by way of the spur wheels 51 the worm shafts 51a and the worm wheels 20. The latter are mounted loosely on spindles 4c of the driving mechanisms 4a of the setting-up devices 4 and can be connected to these spindles by double couplings 22 (Figs. 7 and 11). By means of these double couplings 22 the spindles 4c can, when the connection with the worm wheels 20 is disconnected, be coupled with the spur wheels 22b (Fig. 11), so that the spindles 4c can also be driven by the motor 21 through the spur wheels 22a and 22b directly for centering the workpieces.

By changing the control disc 17 for a disc of other shape the extent of the rotary motion can be varied and by this means the width of cut be regulated and a different thickness of cutting $d$ (forward feed) with approximately the same height of cutting $h$ (Fig. 15) can be obtained.

On the worm shafts 51a are provided couplings 52 (Fig. 12) which can be engaged and disengaged with hand wheels 54. When the coupling is disengaged, the workpiece can be rotated with the hand wheel 53 (Fig. 12).

The vertical control of the two tool slides is derived from a continuously running electric motor 23 (Fig. 10) by way of connected spur gears 23a and 23a' and an electromagnetic coupling 24 which after each stroke of the slide is connected by a switch drum 26 which is driven by the shaft 25. On the shaft 25 are the cams 25a and 25b which act on levers carrying ratchets 31 and 32, one for the upward motion and the other for the downward motion of the slide. These levers are raised intermittently, but can fall down again only as far as the sliding members 30a influenced by the control discs 30 permit (Fig. 13). The discs 30 are turned intermittently by a cam 25c, which is also mounted on the shaft 25, by way of a ratchet 25d, a sliding member 29a, a control disc 29 and changeable wheels 27a, the shaft 28 and the worm drive 28a. The disc 29 is turned through a worm drive 28b by the shaft 28. By the ratchet wheels 31a and 32a of the ratchet arrangements 31 and 32 and by way of a pair of changeable wheels 32b the shaft 33 is driven and by means of the bevel wheels the shaft 34, and from this shaft by means of bevel wheels the shaft 35 and by this shaft each by means of a pair of bevel wheels the screw spindles 36 which are journalled in the tool slide casing and engage in the nuts 36a. Of the nuts 36a one is rigidly connected to the left-hand slide and the other to the right-hand slide. By turning the spindles 36 the slides are thus raised or lowered and the tools 47 are moved away from the workpiece or approached to it, such that the tool always has the same distance from the particular part of the workpiece surface, which is to be tooled.

The tools may also be so constructed as to be capable of working in both directions. Plug cutters (Fig. 6), grinding discs, milling cutters or the like may also be used, according to the nature of the material of the workpiece.

For operating on workpieces, in which the angle of the surface enclosed by the generatrix and the axis of the workpiece is not constant, or on workpieces having broken or curved generatrices, use is made of a suitable vertical adjustment for the workpiece. The arrangement is made such that the setting-up table 2 can be turned about the axis of rotation 2a. The motion is derived from the shaft 7 (Figs. 9 and 11), which through the bevel wheels 7a drives the cam shaft 9a with the two cams 9 which actuate the ratchet levers 10 and 11 of the ratchet wheels 10a and 11a, one for the upward motion and the other for the downward motion. The downward fall of the levers is regulated by controlling discs 18 and sliding members 18a (see also Fig. 13). By the shaft 10a' of the ratchet wheel 10a and 11a through a pair of changeable wheels 11b the shaft 12 is driven, and by this shaft, each by means of a pair of worm wheels 12a and 12b, the nuts of the non-turning screw spindles 13a and 13b (Figs. 8 and 11). The turning of the nuts thus causes the angular displacement of the table 2.

The control discs (17, 18, 29, 30) are arranged so as to be easily exchangeable and are adapted to the form in each case of the workpiece to be planed.

On the carriage of the tool-slides a prismatic guide and a lateral control may be provided (not shown), such that, when the circumferential feed is out of operation, flat surfaces can be planed just as on an ordinary planing machine.

For facilitating the setting-up and removal of the workpiece two supporting pedestals 62, 63 are provided, which in the first place enabled the workpiece to be deposited and then to be adjusted vertically and laterally (Fig. 14). In the bed plate 60 mounted in the table 2 there is journalled a spindle 61 provided with a right-hand and a left-hand thread. Engaging over the spindle threads are female threads of the supporting pedestals 62 and 63, which are provided with rotatable rollers 64 and 65. The spindle 61, on which is mounted a hand wheel 68, is supported in a tubular part 66 which is also provided with a thread and carries the hand wheel 67. By turning the hand wheel 68 the supporting pedestals can thus be displaced, being either moved towards or away from one another and the workpiece being thereby raised or lowered. By turning the larger hand wheel 67 the two supporting pedestals can be moved together and with them the workpiece to the left or right.

The stroke of the planing machine table is preferably made adjustable, it being possible to adjust same to a reduced speed for the beginning and end of the cut, for instance by suitably controllable electromagnetic couplings in the driving means for the table, which corresponds to different speeds.

The tools may be so constructed as to work or operate in two directions (forwards and backwards).

Figures 5, 5A:
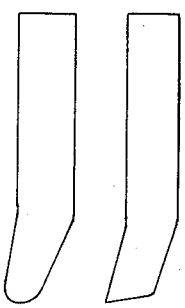
Figs. 5 and 5a show respectively in side and end elevation a planing tool with a rounded cutting edge.
Figure 6:
Figs. 6 and 6a show respectively in side and end elevation the latter partly in section a tool with a round, exchangeable plug cutter.
Figure 6A:
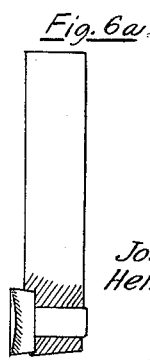

For carrying out the method according to the invention tools may also be used which may have a rounded-out form (Fig. 5) so as to conform to the particular feed motion, more particularly plug cutters (Fig. 6).

On such a machine prismatic workpieces may of course be operated on without any additional arrangement being required.

What we claim is:

1. In a planing machine of the type for operating on the sides of ingots and similar workpieces, and having a movable table for supporting the workpiece, cutting mechanism for operating on the workpiece in a direction parallel to said movable table, means for intermittently rotating the workpiece around its geometrical axis at the completion of each cutting stroke of the cutting mechanism, and means for moving said cutting mechanism into engagement with the workpiece during the cutting operation and moving said cutting mechanism away from said workpiece at the end of each cutting stroke, the improvement which comprises a control disc having a shape complementary to the shape of the workpiece and operatively connected to the cutting mechanism for controlling the movement of the cutting mechanism during and at the end of the cutting stroke.

2. In a planing machine of the type for operating on the sides of ingots and similar workpieces, and having a movable table for supporting the workpiece, cutting mechanism for operating on the workpiece in a direction parallel to said movable table, means for intermittently rotating the workpiece around its geometrical axis at the completion of each cutting stroke of the cutting mechanism, and means for moving said cutting mechanism into engagement with the workpiece during the cutting operation and moving said cutting mechanism away from said workpiece at the end of each cutting stroke, the improvement which comprises a control disc operatively connected to the means for rotating the workpiece and having a shape complementary to the ultimate shape of said workpiece, whereby said workpiece will be rotated a predetermined degree at the end of each cutting stroke.

3. In a planing machine of the type for operating on the sides of ingots and similar workpieces, and having a movable table for supporting the workpiece, cutting mechanism for operating on the workpiece in a direction parallel to said movable table, means for intermittently rotating the workpiece around its geometrical axis at the completion of each cutting stroke of the cutting mechanism, and means for moving said cutting mechanism into engagement with the workpiece during the cutting operation and moving said cutting mechanism away from said workpiece at the end of each cutting stroke, the improvement which comprises a control disc having a shape complementary to the shape of the workpiece and operatively connected to the cutting mechanism for controlling the movement of the cutting mechanism during and at the end of the cutting stroke, and a second control disc operatively connected to the means for rotating the workpiece and having a shape complementary to the ultimate shape of said workpiece, whereby the workpiece will be rotated a predetermined degree at the end of each cutting stroke.

4. In a planing machine of the type for operating on the sides of ingots and similar workpieces, and having a movable table for supporting the workpiece, cutting mechanism for operating on the workpiece in a direction parallel to said movable table, means for intermittently rotating the workpiece around its geometrical axis at the completion of each cutting stroke of the cutting mechanism, means for moving the cutting mechanism into engagement with the workpiece during the cutting operation and moving said cutting mechanism away from the workpiece at the end of each cutting stroke, and means for tilting said table about a horizontal axis during the cutting stroke of the mechanism, the improvement which comprises a control disc having a shape complementary to the shape of the work-piece and operatively connected to the table tilting means for controlling the operation of said tilting means during the cutting stroke of the cutting mechanism.

5. In a planing machine of the type for operating on the sides of ingots and similar workpieces, and having a movable table for supporting the workpiece, cutting mechanism for operating on the workpiece in a direction parallel to said movable table, means for intermittently rotating the workpiece around its geometrical axis at the completion of each cutting stroke of the cutting mechanism, means for moving the cutting mechanism into engagement with the workpiece during the cutting operation and moving said cutting mechanism away from the workpiece at the end of each cutting stroke, and means for tilting said table about a horizontal axis during the cutting stroke of the mechanism, the improvement which comprises a control disc having a shape complementary to the shape of the workpiece and operatively connected to the cutting mechanism for controlling the movement of the cutting mechanism during and at the end of the cutting stroke, a second control disc having a shape complementary to the shape of the workpiece and operatively connected to the table tilting means for controlling the operation of said tilting means during the cutting stroke of the cutting mechanism, and a third control disc operatively connected to the means for rotating the workpiece and having a shape complementary to the ultimate shape of said workpiece, whereby the workpiece will be rotated a predetermined degree at the end of each cutting stroke.

6. In a planing machine of the type for operating on the sides of ingots and similar workpieces, and having a movable table for supporting the workpiece, cutting mechanism for operating on the workpiece in a direction parallel to said movable table, means for intermittently rotating the workpiece around its geometrical axis at the completion of each cutting stroke of the cutting mechanism, means for moving the cutting mechanism into engagement with the workpiece during the cutting operation and moving said cutting mechanism away from the workpiece at the end of each cutting stroke, and means for tilting said table about a horizontal axis during the cutting stroke of the mechanism, the improvement which comprises a control disc having a shape complementary to the shape of the workpiece and operatively connected to the table tilting means for controlling the operation of said tilting means during the cutting stroke of the cutting mechanism, pedestals on the movable table for supporting the workpiece, and means for moving the pedestals toward or away from each other to facilitate setting of the workpiece on said table.

JOSEF MUSIL.
HEINRICH AST.